(12) United States Patent
Hutchinson

(10) Patent No.: US 7,783,448 B2
(45) Date of Patent: Aug. 24, 2010

(54) SENSOR PROCESSING METHOD

(75) Inventor: Andrew Hutchinson, Williamsburg, VA (US)

(73) Assignee: General Electric Company, Schenectady, NY (US)

(*) Notice: Subject to any disclaimer, the term of this patent is extended or adjusted under 35 U.S.C. 154(b) by 126 days.

(21) Appl. No.: 12/130,977

(22) Filed: May 30, 2008

(65) Prior Publication Data

US 2009/0299658 A1 Dec. 3, 2009

(51) Int. Cl.
*G01L 11/00* (2006.01)
*G06F 19/00* (2006.01)

(52) U.S. Cl. ........................................ 702/138; 702/98

(58) Field of Classification Search ................. 702/138, 702/99, 98; 73/861.22, 861.38
See application file for complete search history.

(56) References Cited

U.S. PATENT DOCUMENTS

| 4,644,482 | A | * | 2/1987 | Juanarena | 702/98 |
| 5,497,665 | A | * | 3/1996 | Cage et al. | 73/861.356 |
| 6,484,590 | B1 | * | 11/2002 | Kleven et al. | 73/861.22 |

* cited by examiner

*Primary Examiner*—Bryan Bui
(74) *Attorney, Agent, or Firm*—Global Patent Operation; Mark A. Conklin

(57) ABSTRACT

A pressure sensor and method wherein a resonant pressure transducer has a frequency F which changed depending on the applied pressure P and the temperature T. A temperature sensor measures the temperature T. A memory includes stored therein data points corresponding to the sensor's frequency F at difference applied pressures and temperatures. A processor is configured to generate several polynomials from the data points and calculate $P\mu$ at $T\mu$ when the transducer frequency is $F\mu$.

12 Claims, 3 Drawing Sheets

SENSOR PROCESSING METHOD

FIELD OF THE INVENTION

This subject invention relates to sensors, in one example, a pressure sensor.

BACKGROUND OF THE INVENTION

Sensors must be calibrated. In one example, a pressure indicator includes a resonant pressure transducer whose frequency changes depending upon the applied pressure. The relationship between the sensor input (pressure) and the sensor output (frequency changes) however, is not linear. Moreover, the resonant frequency also changes as a function of temperature. Thus, the pressure indicator typically includes a temperature sensor and both temperature and frequency signals are input to a microprocessor. Calibration and compensation data is stored in a memory, (i.e., an EEPROM) linked to the microprocessor.

During calibration, several known pressures are applied to the sensor at several known temperatures. The microprocessor, programmed to apply various curve fitting techniques, then calculates the calibration data and stores it in the memory in the form:

$$P = f(F, T) \tag{1}$$

where F is the frequency, P is the pressure, and T is temperature. In one example, $$P = a_0 + b_0 \cdot F + c_0 \cdot F^2 + d_0 \cdot F^3 + a_1 \cdot T + b_1 \cdot F \cdot T + c_1 \cdot F^2 \cdot T + d_1 \cdot F^3 \cdot T + a_2 \cdot T^2 + b_2 \cdot F \cdot T^2 + c_2 \cdot F^2 \cdot T^2 + d_2 \cdot F^3 \cdot T^2 + a_3 \cdot T^3 + b_3 \cdot F \cdot T^3 + c_3 \cdot F^2 \cdot T^3 + d_3 \cdot F^3 \cdot T^3$$

Here the coefficients $a_0 \ldots d_3$, are calculated from the calibration data and are used to approximate the relation of F and T to the output P. Linear approximation schemes such as least square fit, or an exact fit from a prescribed number of data points may be used.

When the sensor is used in the field, the microprocessor notes the temperature and frequency of the transducer and calculates the pressure readout based on equation (2).

For high accuracy use, this scheme has a number of limitations.

First, the fit of the polynomial is dependent on the order of the polynomial chosen. Higher order polynomials provide a better fit but significantly increase the computational burden which limits the speed and accuracy of calculations.

Second, high order polynomials are notoriously ill behaved and exhibit oscillatory characteristics not fount in the original data.

Third, the estimation at the boundaries of the original data is poor, with extreme divergence outside of the boundaries of the original data.

Other methods such as Bezier curves and Hermite Splines may also be used to overcome some of the unnatural behaviors of the polynomials. Such methods, however, involve significant computational burden thus limiting their usefulness in systems where computational power is limited.

Cubic splines techniques have also been used to fit data. Such methods have the advantage that curvature is controlled to avoid sharp transitions. However, such methods depend on prior knowledge of curvature constraints and end point characteristics that are often unknown or too variable creating errors in the resultant fit that do not appear in the measurement data. Furthermore, the complexity of the calculation is substantial.

In the prior art, the calculations involved require the use of double precision floating point operations to maintain calculation errors below 1 ppm. This alone almost quadruples the computational load for a small microprocessor based system.

BRIEF SUMMARY OF THE INVENTION

The subject invention features a new processing method for a pressure sensor. The pressure and temperature effects of a sensor are corrected using calibration points and highly efficient and accurate algorithms. The method allows rapid and accurate determinations of the output of a sensor and avoids the need for double precision floating point calculations. The method minimizes rounding errors, results in faster signal processing, and results in lower power consumption. The subject invention further features a pressure sensor which incorporates the method discussed above. Moreover, the method can be employed with other types of sensors.

In one aspect, the subject invention features a method of sensing pressure. The method comprises subjecting a pressure sensor having an output P which varies based on the sensor's frequency F and the temperature T to several different temperatures and applied pressures, determining the sensor's frequency F at the different temperatures and applied pressures and collecting data points representing the same, and, from the data points and at each different temperature, generating several polynomials $P = f(F)$ and $T = f(F)$. The sensor is then used to sense an unknown pressure $P\mu$ at a temperature $T\mu$ at which the sensor has a frequency $F\mu$. From the generated polynomials, several polynomials that surround $T\mu$ and $F\mu$ are selected. Those polynomials are evaluated for $F\mu$ to calculated values for $P = f(F\mu)$ and $T = f(F\mu)$. From the calculated values, a polynomial $P = f(T)$ is generated and solved for $T\mu$ in order to output $P\mu$.

In one example, generating the polynomials includes employing Newton's method. The generated polynomials may be stored or the data points can be stored and then the polynomials are not generated until the surrounding data points are selected. Solving $P\mu = f(T)$ may include using Lagrange's method.

The subject invention also features a pressure sensor comprising a resonant pressure transducer whose frequency F changes depending on the applied pressure P and the temperature T, a temperature sensor for measuring the temperature T, and a memory including stored therein data points corresponding to the sensor's frequency F at different applied pressures and temperatures. A processor is configured to generate several polynomials $P = f(F)$ and $T = f(F)$ from the data points and to calculate $P\mu$ at $T\mu$ when the transducer frequency is $F\mu$. From the generated polynomials, polynomials that surround $F\mu$ and $T\mu$ are selected, the selected polynomials are evaluated for $F\mu$ to calculated values for $P = f(F\mu)$ and $T = f(F\mu)$, a polynomial $P = f(T)$ is generated for the calculated values and $P\mu = f(T)$ is solved for $T\mu$. The processor then outputs $P\mu$.

More generically, the subject invention features a method of determining an unknown parameter Z based on two measured parameters X and Y. The preferred method comprises determining Z at different values of X and Y and collecting data points representing the same. From the data points, several polynomials $Z = f(X)$ and $X = f(Y)$ are generated. An unknown parameter $Z\mu$ at $X\mu$ and $Y\mu$ is determined. From the generated polynomials, polynomials that surround $X\mu$ and $Y\mu$ are selected. The selected polynomials are evaluated for Yµ to calculated values for $Z=f(Y\mu)$ and $X=f(Y\mu)$. From the calculated values, a polynomial $X=f(X)$ is generated. $Z\mu=f(X)$ for $X\mu$ is solved and $Z\mu$ is output.

A sensor system is accordance with the subject invention features a sensor with a parameter Y that changes depending on parameter Z and parameter X. A device measures parameter X. A memory includes stored therein data points corresponding to values of parameter Y at different values of Z and Z. A processor is configured to general several polynomials from the data points and calculated $Z\mu$ at $X\mu$ when the sensor measure Yµ. Polynomials that surround Yµ and Xµ are selected and evaluated for Yµ to calculated values for $Z=f(Y\mu)$ and $X=f(Y\mu)$. A polynomial $Z=f(X)$ is generated for the calculated values, and $Z\mu=f(X)$ is solved for $X\mu$.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
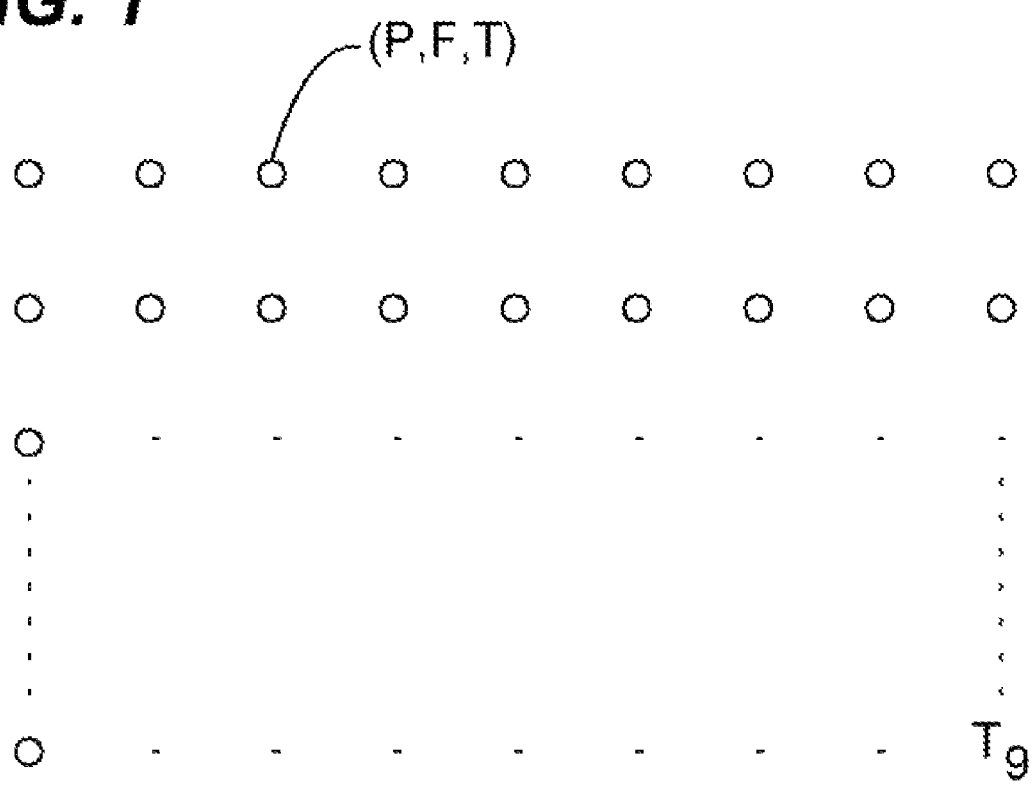
FIG. 1 shows an example of calibration data points collected in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

The subject invention uses simple interpolating polynomial functions that represents the function accurately over a narrow range in one dimension. The full range is achieved by providing sets of such polynomials. Two dimensional interpolation is then realized by creating several sets of polynomials which are then combined to form a unified representation of the data.

Typically, calibration data points are collected from measurements taken to form grid of sensor characteristics in at least two variables. In one example, this would be the measurement of sensor frequency F and sensor temperature T at various applied pressures ($P_{applied}$) and test temperatures ($T_{applied}$). For example, this might be at 9 pressures and 5 temperatures yielding 45 data points as shown in FIG. 1. There is no requirement for the grid to be either equally spaced nor contain equal number of points in each dimension. Indeed, it may be preferable to have a higher point density in areas of uncertainty.

Each of these points would have associated with them precisely measured values of P, F and T. The measured values of P and T may differ significantly from the applied values.

Figure 2:
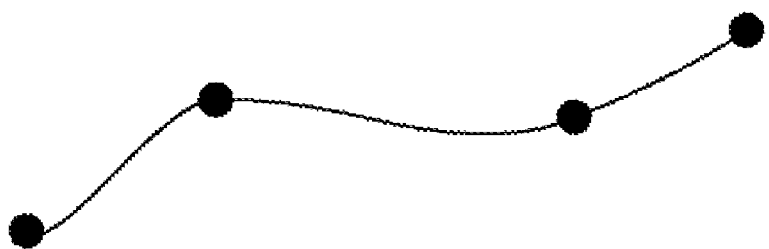
FIG. 2 depicts how a polynomial is calculated in accordance with the subject invention.

Various means are used to fit an interpolating polynomial of order "n" to "n+1" data points. This solution is unique and the function exactly passes thru the calibration data points. For example, 4 points can be used to define the cubic polynomial shown in FIG. 2.

For each row in the point grid or FIG. 1, there are a set of points representing the function. Several "$n^{th}$" order polynomials can be fitted to adjacent data points. If the number of points in the row is P, there will be p-n such polynomials.

In this example, each value of $T_{applied}$ will have 9 points (P, F, T) allowing a set of six cubic polynomial $P=f(F)$ to be calculated for each value of $T_{applied}$.

Figure 3:
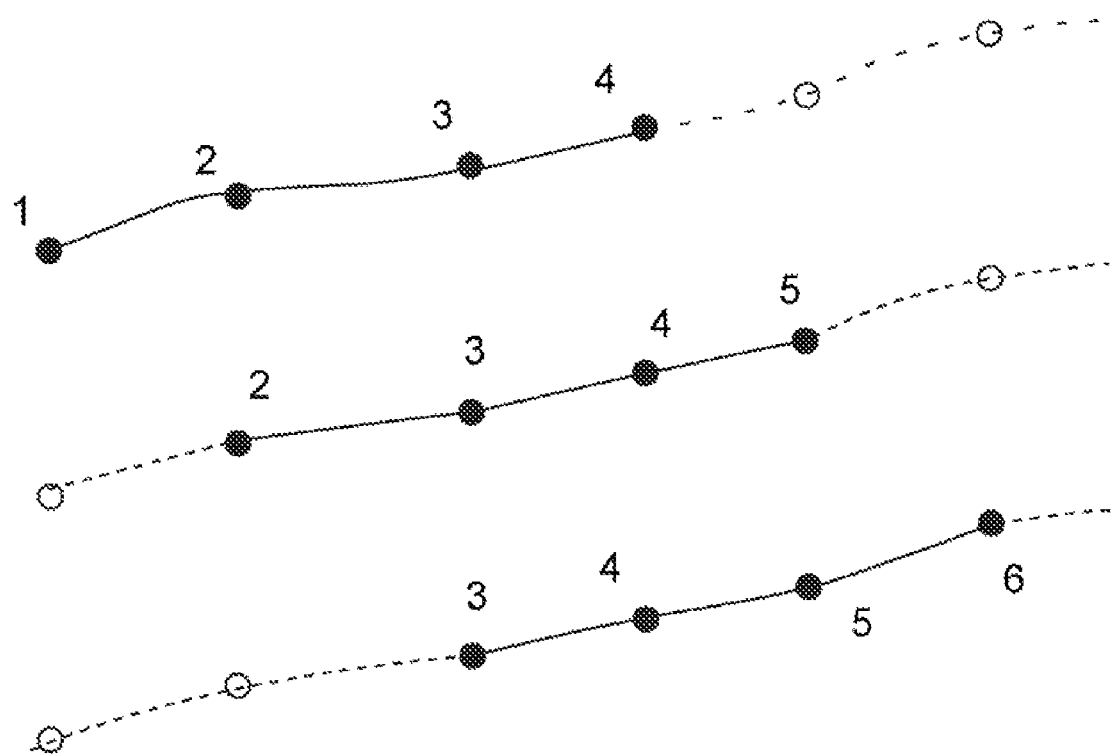
FIG. 3 shows how six points create three cubic polynomials from four adjacent data points in accordance with the subject invention.

FIG. 3 shows how 6 points create 3 cubic polynomials from 4 adjacent points.

Figure 4:
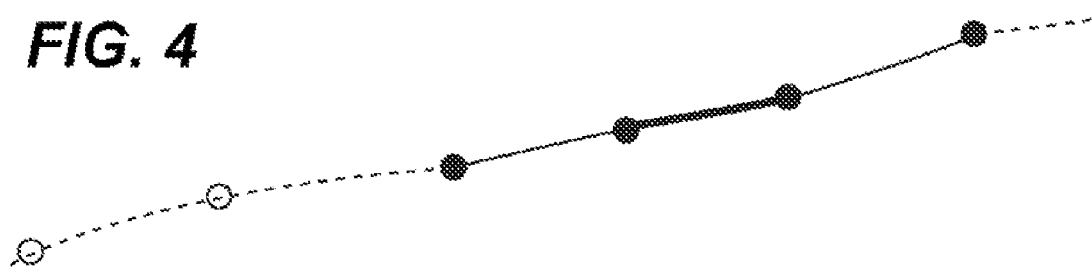
FIG. 4 shows how the most accurate estimation is in the region bounded by the two centermost points that created the polynomial.

Since the polynomials overlap, they provide several estimates of the function. The most accurate estimation is in the region bounded by the two centermost points that created the polynomial as shown in FIG. 4. At the extremes of data, where no choice exists we use the nearest polynomial estimation can be used.

With this selection, there is now a method to provide an accurate estimation across the range bounded by the data points. There will be one such estimate for every row in the original data.

The process is then repeated for the second variable. In the example, this would yield 6 polynomials $T=f(F)$ for each value of $T_{applied}$. The two polynomial sets above are created for all rows. So in the present example, this would give 5 sets, each containing 6 polynomials $P=f(F)$ and 6 polynomials $T=f(F)$.

Calculation of these all polynomials (60 in this example) may present a severe challenge to both the computational power and accuracy that can be achieved in a simple sensor device. So, Newton's method can be used to solve these polynomials. This method accurately computes the Newtonian form of polynomial and can exploit the adjacent nature of the points to use "Newton's Triangle" to substantial reduce computational requirements and enhance accuracy.

The polynomials may be pre-calculated and held in memory. Alternatively the defining data points alone may be held in memory and polynomial calculation delayed until it is needed. For the first method, there are two tables of 30 polynomials related to the row/column order of the original data points (instead of 9×5, there would be 6×5 i.e. 5 sets each containing 6 polynomials.)

In the field where the pressure sensor is subjected to a pressure P at a temperature Tµ, the frequency of the transducer is Fµ. To evaluate the function P at any point FµTµ, the polynomial sets that surround the point are selected. Selection of these polynomials (or their defining points) is accomplished using a simple search of the data point table held in memory. For the unknowns Tµ and Fµ, the table of polynomials is searched to find the ones which surround the unknown. In the example, four are needed for a cubic fit so that is two on either side. For the second method, only the original data is stored. So, instead of finding the four polynomials which surround Tμ and Fμ, all the points which define those polynomials are located. This would be a collection of 16 points that surround Tμ and Fμ. A cubic function suits the variability of P with T, so for any given point the four nearest sets that surround that point are selected.

Each of these sets of polynomials can now be evaluated to give P and T values for the given value of Fμ using a substitution in the pre-calculated Newtonian polynomials. Alternatively a combined interpolation and evaluation of the original data points using Lagrange's method can be employed. In this case, 16 original data points would be chosen, to create four polynomials.

Figure 5:
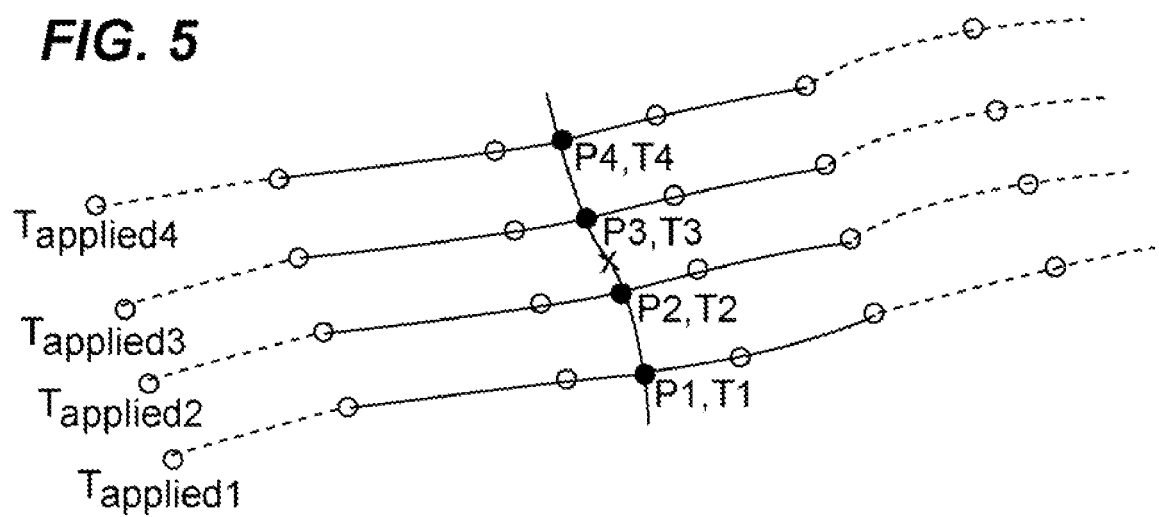
FIG. 5 shows how four surrounding sets provide four valves of pressure and four valves of temperature in accordance with the subject invention.

In our example, the four surrounding sets provide four values of P and four values of T for the given value Fμ as shown in FIG. 5.

These four new points define a cubic polynomial function $P=f(T)$ which can then be evaluated at the given value of Tμ to provide final output P.

As only one evaluation is needed for the final polynomial, it is advantageous to use Lagrange's method to combine both interpolation and evaluation operations. This has lower computational demands and higher accuracy than separately creating the polynomial and evaluating it.

As has been shown, Lagrange and Newton's method can be used to substantially reduce the computational power required. Newton's method allows a pre-calculation of all the polynomials in an accurate and efficient manner leaving only the evaluation of m+1 of these polynomials and final interpolation using Lagrange's method.

Alternatively, to conserve memory, just the original data points maybe be stored. Lagrange's method can then be used to combine both interpolation and evaluation.

Figure 6:
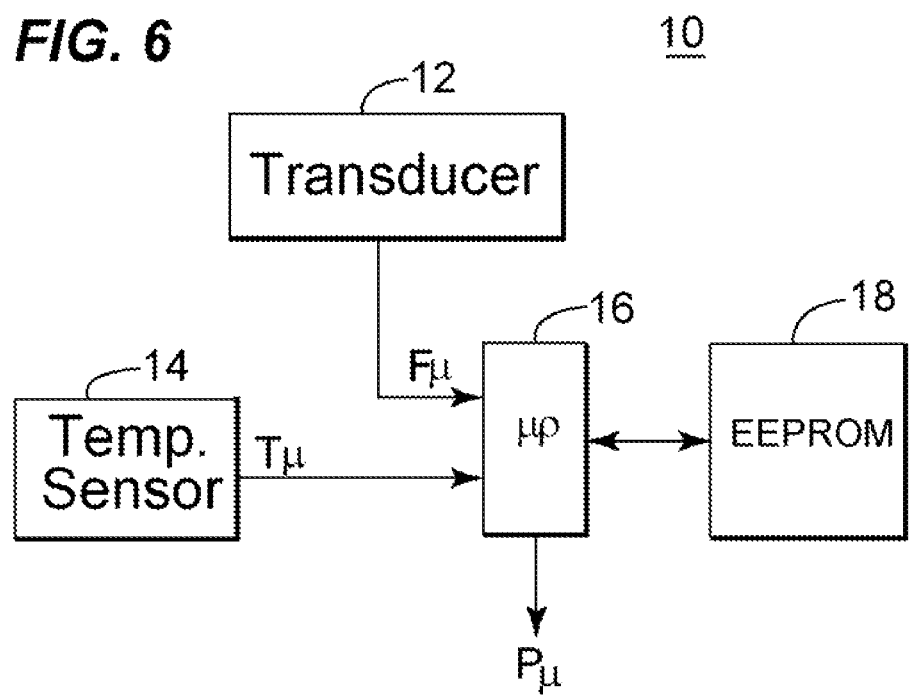
FIG. 6 is a highly schematic block diagram showing the primary components associated with an example of a sensor in accordance with the subject invention.

FIG. 6 shows pressure sensor 10 having an output P and transducer 12 which generates a different frequency F when subject to different pressures. Temperature sensor 14 measures the temperature T. Processor 16 is responsive to both F and T and is configured (e.g.) programmed to operate according to the method discussed above. EEPROM 18 (or some other memory) stores the values of F and P at different temperatures T as discussed above in reference to FIG. 1. Processor 16 outputs (to a display, for example) Pμ when transducer 12 is subject to Pμ at temperature Tμ and exhibits a frequency Fμ. The above method has yielded accuracy of better than 1 ppm using single precision floating point calculations.

But, the subject invention is not limited to pressure transducers and the method described above can be used with other types of sensors. Generally, it is assumed that data has been collected from test or calibration measurements. This data is of the form (X,Y,Z). For example, consider a test of a pressure sensor across a range of different applied pressures and temperatures. Z is the measured pressure, X is the temperature sensor measurement and Y is the output of the sensor.

The following procedure will then accurately estimate the value of Z for any given value of X=x and Y=y, using a two dimensional polynomial function of order m×n.

In step one, the data points (X,Y,Z) are arranged to represent a grid of Z values for two input variables X and Y where X and Y are in monotonic order. See FIG. 1. In step two, the (m+1) by (n+1) point matrix that spans the (x, y) point to be evaluated is selected. In step three, m+1 polynomials of order n using n+1 points where $Z=f(Y)$ are solved. In step four, m+1 polynomials of order n using n+1 points where $X=f(Y)$ are solved. In step five, the polynomials found in step four, are evaluated for the input value of Y=y to give m+1 values for Z and X. In step six, the polynomial of order m is solved using the m+1 data points for $Z=f(X)$. Then, in step seven, Z is evaluated using the polynomial from step six for the input value of X=x.

Selecting the point matrix may be accomplished using a search of the data values. This search maybe optimized for efficiency using established methods.

Steps three and four, solving the $Z=f(Y)$ and $X=f(Y)$ polynomials, may be optimized by pre-calculating the polynomials using the Newtonian form to preserve accuracy and calculation efficiency. Alternatively, these steps and the evaluation step may be combined using Lagrange's interpolation to reduce memory requirements and still maintains accuracy. The last two steps are preferably combined using Lagrange's interpolation and evaluation.

The subject invention can be employed in a wide variety of sensor and control applications. For example, in engine control, it is common to take two measurements to derive a third parameter. For example, RPM and manifold pressure can be used to determine ignition timing. The method of this invention can be used in such an application and the original data might be based on experimental or modeled conditions and the output would not typically be an indicator but instead part of the overall system control function.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A method of sensing pressure with a pressure sensor, the method comprising:
subjecting the pressure sensor having on output P which varies based on the sensor's frequency F and the temperature T to several different temperatures and applied pressures;
determining the pressure sensor's frequency F at the different temperatures and applied pressures and collecting data points representing the same;
from the data points and at each different temperature, generating several polynomials $P=f(F)$ and $T=f/(F)$;
using the pressure sensor to sense an unknown pressure Pμ at a temperature Tμ at which the pressure sensor has a frequency Fμ;
selecting, from the generated polynomials, polynomials that surround Tμ and Fμ;
evaluating the selected polynomials for Fμ to calculate values for $P=f(Fμ)$ and $T=f(Fμ)$;

from the calculated values, generating a polynomial $P=f(T)$; and solving $P\mu=f(T)$ for $T\mu$ and outputting $P\mu$.

2. The method of claim 1 in which generating the polynomials includes employing Newton's method.

3. The method of claim 1 in which the generated polynomials are stored.

4. The method of claim 1 in which the data points are stored and the polynomials are not generated until the surrounding data points are selected.

5. The method of claim 1 in which solving $P\mu=f(T)$ includes using Lagrange's method.

6. A pressure sensor comprising:
a resonant pressure transducer whose frequency F changes depending on the applied pressure P and the temperature T;
a temperature sensor for measuring the temperature T;
a memory including stored therein data points corresponding to the sensor's frequency F at different applied pressures and temperatures; and a processor configured to:
generate several polynomials $P=f/(F)$ and $T=f(F)$ from the data points,
calculate $P\mu$ at $T\mu$ when the transducer frequency is $F\mu$ by:
selecting, from the generated polynomials, polynomials that surround $F\mu$ and $T\mu$,
evaluating the selected polynomials for $F\mu$ to calculate values for $P=f(F\mu)$ and $T=f(F\mu)$,
generating a polynomial $P=f(T)$ for the calculated values, and
solving $P\mu=f(T)$ for $T\mu$, and output $P\mu$.

7. A method of determining an unknown parameter Z based on two parameters X and Y measured at least a first sensor, the method comprising:
determining Z with a second sensor at different values of X and Y and collecting data points representing the same;
from the data points, generating several polynomials $Z=f(X)$ and $X=f(Y)$;
determining an unknown parameter $Z\mu$ at $X\mu$ and $Y\mu$;
selecting, from the generated polynomials, polynomials that surround $X\mu$ and $Y\mu$;
evaluating the selected polynomials for $Y\mu$ to calculate values for $Z=f(Y\mu)$ and $X=f(Y\mu)$;
from the calculated values, generating a polynomial $Z=f(X)$; and
solving $Z\mu=f(X)$ for $X\mu$ and outputting $Z\mu$.

8. The method of claim 7 in which generating the polynomials includes employing Newton's method.

9. The method of claim 7 in which the generated polynomials are stored.

10. The method of claim 7 in which the data points are stored and the polynomials are not generated until surrounding data points are selected.

11. The method of claim 7 in which solving $Z\mu=f(X)$ includes using Lagrange's method.

12. A sensor system comprising:
a sensor with a parameter Y that changes depending on parameter Z and parameter X;
a device which measures parameter X;
a memory including stored therein data points corresponding to values of parameter Y at different values of Z and X; and
a processor configured to:
generate several polynomials $Z=f(X)$ and $X=f(Y)$ from the data points,
calculate $Z\mu$ at $X\mu$ when the sensor measures $Y\mu$ by:
selecting, from the generated polynomials, polynomials that surround $Y\mu$ and $X\mu$,
evaluating the selected polynomials for $Y\mu$ to calculate values for $Z=f(Y\mu)$ and $X=f(Y\mu)$,
generating a polynomial $Z=f(X)$ for the calculated values, and solving $Z\mu=f(X)$ for $X\mu$, and output $Z\mu$.

* * * * *

UNITED STATES PATENT AND TRADEMARK OFFICE
CERTIFICATE OF CORRECTION

| | | |
|---|---|---|
| PATENT NO. | : 7,783,448 B2 | Page 1 of 1 |
| APPLICATION NO. | : 12/130977 | |
| DATED | : August 24, 2010 | |
| INVENTOR(S) | : Hutchinson | |

It is certified that error appears in the above-identified patent and that said Letters Patent is hereby corrected as shown below:

In Column 5, Line 63, delete "Z=J(Y)" and insert -- $Z=f(Y)$ --, therefor.

In Column 5, Line 64, delete "X=J(Y)" and insert -- $Z=f(Y)$ --, therefor.

In Column 6, Line 60, in Claim 1, delete "T=ƒ/(F);" and insert -- $T=f(F)$; --, therefor.

In Column 7, Line 22, in Claim 6, delete "P=ƒ/(F)" and insert -- $P=f(F)$ --, therefor.

Signed and Sealed this
Eighth Day of March, 2011

David J. Kappos
*Director of the United States Patent and Trademark Office*